United States Patent
Mahadevaiyer et al.

(10) Patent No.: US 7,602,768 B2
(45) Date of Patent: Oct. 13, 2009

(54) METHOD OF OPTIMIZING USE OF HIGH-RATE PACKET DATA RESOURCES

(75) Inventors: Saraswathi A. Mahadevaiyer, Arlington Heights, IL (US); Jonathan H. Gross, Gilbert, AZ (US)

(73) Assignee: Motorola, Inc., Schaumburg, IL (US)

( * ) Notice: Subject to any disclaimer, the term of this patent is extended or adjusted under 35 U.S.C. 154(b) by 292 days.

(21) Appl. No.: 11/411,632

(22) Filed: Apr. 26, 2006

(65) Prior Publication Data
US 2007/0253378 A1 Nov. 1, 2007

(51) Int. Cl.
H04L 12/66 (2006.01)
H04B 7/216 (2006.01)

(52) U.S. Cl. .................... 370/352; 370/335; 370/353

(58) Field of Classification Search .............. 455/507, 455/508, 450, 451, 452.1, 452.2, 455, 516, 455/517, 509; 370/329, 330, 331, 332, 356, 370/352, 337, 347, 229, 339, 401, 443, 458, 370/431, 461, 402, 281, 444
See application file for complete search history.

(56) References Cited
U.S. PATENT DOCUMENTS
6,418,148 B1 * 7/2002 Kumar et al. ............... 370/468

2006/0274692 A1 * 12/2006 Ryu .......................... 370/331
2007/0140171 A1 * 6/2007 Balasubramanian ........ 370/331

* cited by examiner

Primary Examiner—Melody Mehrpour

(57) ABSTRACT

A method of optimizing use of a plurality of high-rate packet data (HRPD) resources may include assigning one of the plurality of HRPD resources to each of a plurality of mobile stations that is coupled to a radio access network, where the one of the plurality of HRPD resources is used to establish one of a plurality of HRPD sessions between one of the plurality of mobile stations and a radio access network, and where each of the plurality of mobile stations is not using packet-switched data channel. Subsequently an additional mobile station wirelessly coupling to the radio access network and requesting an HRPD resource. A first HRPD resource is reassigned to the additional mobile station without notifying the first mobile station, where the first HRPD resource is used to establish an additional HRPD session between the additional mobile station and the radio access network. The first HRPD session and the additional HRPD session are simultaneously maintained using the first HRPD resource while the first mobile station is not using the PSD channel.

24 Claims, 4 Drawing Sheets

400

500

METHOD OF OPTIMIZING USE OF HIGH-RATE PACKET DATA RESOURCES

BACKGROUND OF INVENTION

In wireless networks that contain both voice-optimized networks and data-optimized networks, for example EV-DO networks, hybrid mobile stations that support both the voice-optimized and data-optimized technologies require a high-rate packet data (HRPD) session even when the mobile station is only using voice-optimized services. This uses up HRPD session capacity even though those mobile stations are not actively using the data-optimized network. This can result in an unbalanced capacity usage of a base station controller and it is possible to exhaust the HRPD session capacity of a base station controller before reaching other capacity limits of the wireless network.

There is a need, not met in the prior art, for optimizing the use of HRPD sessions and HRPD resources in the wireless network. Accordingly, there is a significant need for an apparatus and method that overcomes the deficiencies of the prior art outlined above.

BRIEF DESCRIPTION OF THE DRAWINGS

Representative elements, operational features, applications and/or advantages of the present invention reside inter alia in the details of construction and operation as more fully hereafter depicted, described and claimed—reference being made to the accompanying drawings forming a part hereof, wherein like numerals refer to like parts throughout. Other elements, operational features, applications and/or advantages will become apparent in light of certain exemplary embodiments recited in the Detailed Description, wherein:

Figure 1:
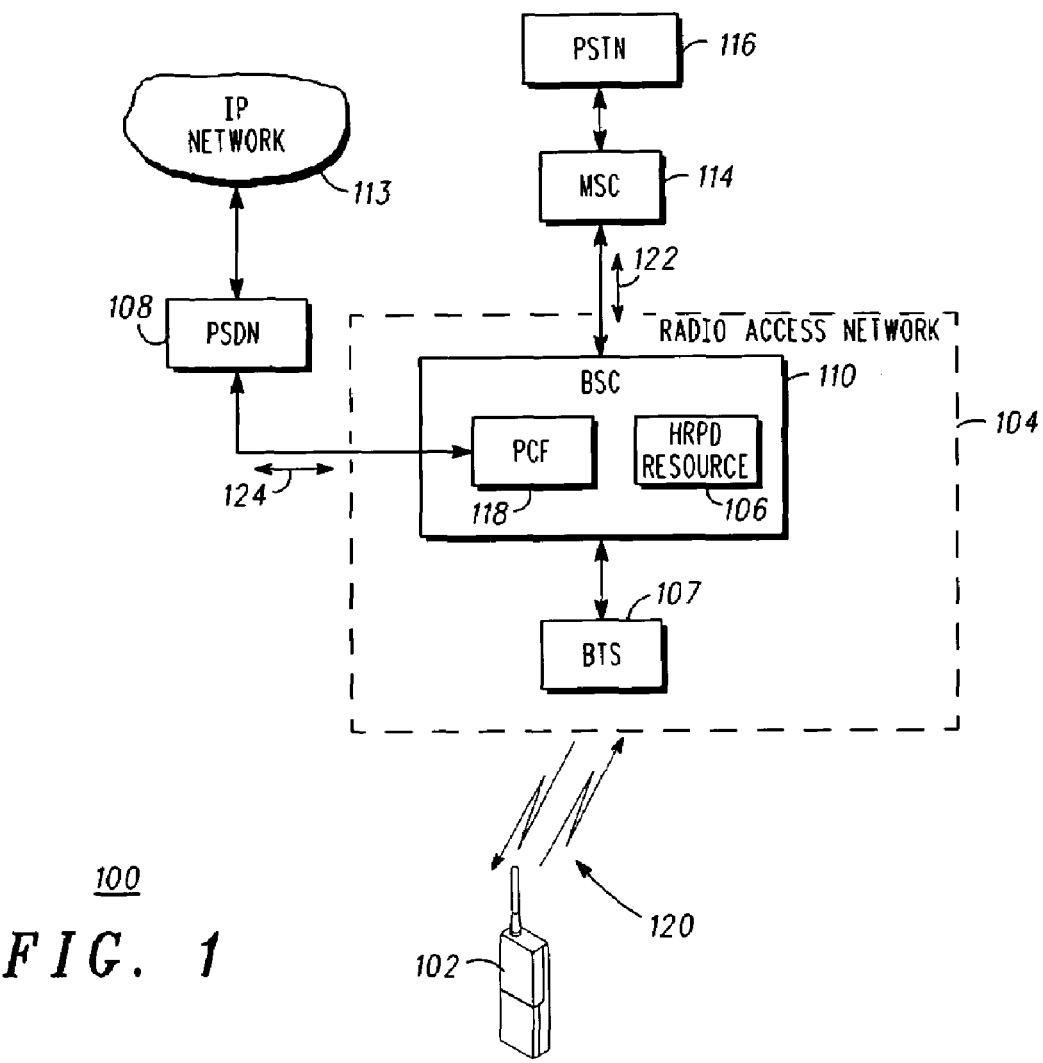
FIG. 1 representatively illustrates a block diagram of a communication network in accordance with an exemplary embodiment of the present invention.

Elements in the Figures are illustrated for simplicity and clarity and have not necessarily been drawn to scale. For example, the dimensions of some of the elements in the Figures may be exaggerated relative to other elements to help improve understanding of various embodiments of the present invention. Furthermore, the terms "first", "second", and the like herein, if any, are used inter alia for distinguishing between similar elements and not necessarily for describing a sequential or chronological order. Moreover, the terms "front", "back", "top", "bottom", "over", "under", and the like in the Description and/or in the Claims, if any, are generally employed for descriptive purposes and not necessarily for comprehensively describing exclusive relative position. Any of the preceding terms so used may be interchanged under appropriate circumstances such that various embodiments of the invention described herein may be capable of operation in other configurations and/or orientations than those explicitly illustrated or otherwise described.

DETAILED DESCRIPTION OF EXEMPLARY EMBODIMENTS

The following representative descriptions of the present invention generally relate to exemplary embodiments and the inventor's conception of the best mode, and are not intended to limit the applicability or configuration of the invention in any way. Rather, the following description is intended to provide convenient illustrations for implementing various embodiments of the invention. As will become apparent, changes may be made in the function and/or arrangement of any of the elements described in the disclosed exemplary embodiments without departing from the spirit and scope of the invention.

For clarity of explanation, the embodiments of the present invention are presented, in part, as comprising individual functional blocks. The functions represented by these blocks may be provided through the use of either shared or dedicated hardware, including, but not limited to, hardware capable of executing software. The present invention is not limited to implementation by any particular set of elements, and the description herein is merely representational of one embodiment.

The terms "a" or "an", as used herein, are defined as one, or more than one. The term "plurality," as used herein, is defined as two, or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically.

Software blocks that perform embodiments of the present invention can be part of computer program modules comprising computer instructions, such control algorithms that are stored in a computer-readable medium such as memory. Computer instructions can instruct processors to perform any methods described below. In other embodiments, additional modules could be provided as needed.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

A communication system in accordance with the present invention is described in terms of several preferred embodiments, and particularly, in terms of a wireless communication network operating in accordance with at least one of several standards. These standards may include analog, digital or dual-mode communication system protocols such as, but not limited to, the IS-95 Code Division Multiple Access (CDMA) digital cellular, demand assignment schemes (DA/TDMA, DA/CDMA, DA/FDMA), the Wideband Code Division Multiple Access (WCDMA), CDMA 2000 EV-DO, the Personal Communications System (PCS), 3G, 3GPP, the Universal Mobile Telecommunications System (UMTS) and variations and evolutions of these protocols.

Wireless communication systems are well known and consist of many types including land mobile radio, cellular radiotelephone (inclusive of analog cellular, digital cellular, personal communication systems (PCS) and wideband digital cellular systems), and other communication system types. In cellular communication systems, for example, a number of communication cells are typically comprised of one or more Base Transceiver Stations (BTSs) coupled to one or more Base Station Controllers (BSCs) or Central Base Station Controllers (CBSCs) and forming a network access node. The BSCs or CBSCs may be, in turn, coupled to a Mobile Switching Center (MSC) or Packet Control Function (PCF), which provides a connection between the network access node and an external network, such as a Public Switched Telephone Network (PSTN), IP network, as well as interconnection to other network access nodes. Each BTS provides communication services to a mobile station (MS) located in a coverage area serviced by the BTS via a communication resource that includes a forward link for transmitting signals to, and a reverse link for receiving signals from, the MS.

FIG. 1 representatively illustrates a block diagram of a communication network 100 in accordance with an exemplary embodiment of the present invention. Communication network 100 includes a RAN 104 comprising at least one BTS 107 that is coupled to a BSC 110. RAN 104 may be coupled to an MSC 114, and MSC 114 is in turn coupled to a PSTN 116 and provides a communication link between the PSTN 116, or other RANs, and RAN 104. In an embodiment, RAN 104 may be a CDMA network having Evolution Data Optimized (EV-DO) capability.

Communication network 100 may further include a mobile station 102 coupled to wirelessly communicate with RAN 104. In an embodiment, mobile station 102 may be a cellular phone, PDA, laptop computer, desktop computer or any other electronic device capable of communicating with RAN 104. Mobile station is coupled to wirelessly communicate with RAN 104 over wireless link 120, which may include a forward link and a reverse link.

In an embodiment, BSC 110 may also include Packet Control Function (PCF) 118. In an embodiment, PCF 118 is coupled to communicate packet data, particularly IP packet data, between the mobile station 102, and the Packet Data Serving Node (PDSN) 108 over an interface, the A10/A11 interface in the case of a CDMA network. PDSN 108 may be coupled to one or more Internet Protocol (IP) networks 113. Packet control function 118 may operate to maintain a reachable state between RAN 104 and mobile station 102, ensuring a consistent link for data packets, buffering of data packets arriving from PDSN 108 when wireless link resources are not in place or are insufficient to support the flow from PDSN 108, and relay data packets between the mobile station 102 and PDSN 108. PCF 118 is not limited to a PCF in a CDMA network and may include one or more nodes in other radio access networks such as GSM, TDMA, and the like, that perform a substantially similar function.

PDSN 108 may be coupled to operate as the gateway from the RAN 104 into a public and/or private packet network, for example and without limitation, the IP network 113. In an embodiment, PDSN 108 may act as a network access server, home agent, foreign agent, and the like. PDSN 108 may manage the radio-packet interface between RAN 104 and IP network 113, provide IP addresses for the subscriber's mobile station 102, perform packet routing, actively manage subscriber services based on profile information, authenticate users, and the like.

In an embodiment, communication network 100 may be an EV-DO capable network, for example CDMA 1xEV-DO, which is set forth in the specification entitled "CDMA2000 High Rate Packet Data Air Interface Specification" found at www.cdg.org. Communication network 100 may be EV-DO capable so as to include the current and subsequent revisions of the EV-DO specification.

When deployed with a voice-optimized network, such as CDMA, EV-DO may use a separate communication channel, for example a packet-switched data (PSD) channel 124 to communicate data only. However, PSD channel 124 may communicate voice using Voice over IP (VoIP). The older CDMA voice-optimized network may operate over a separate circuit-switched (CS) voice or data channel 122. Mobile station 102 may communicate using one or both of PSD channel 124 and CS channel 122.

As is known in the art, a mobile station 102 that is capable of communicating using both CS channel 122 and PSD channel 124 (a hybrid mobile station) requires that a High-Rate Packet Data (HRPD) session be open between the mobile station and the RAN 104 even when mobile station 102 is only communicating using the CS channel 122.

An HRPD session is a shared state between the mobile station 102 and the RAN 104. This shared state stores the protocols and protocol configurations (HRPD resource 106) that were negotiated and are used for communications between the mobile station 102 and the RAN 104. Other than to open a session, a mobile station 102 cannot communicate with an RAN 104 without having an open HRPD session. Note that it is possible that a point-to-point protocol (PPP) connection is not established between mobile station 102 and PDSN 108 even though the HRPD session is established.

An HRPD resource 106 may include a terminal identifier, for example and without limitation, a Unicast Access Terminal Identifier (UATI). HRPD resource 106 may also include memory space allocated to store and/or maintain the HRPD session.

Figure 2:
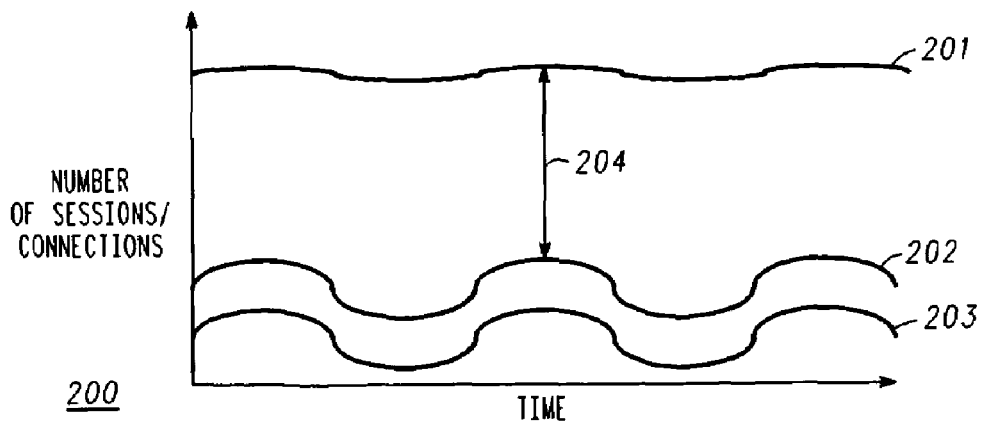
FIG. 2 representatively illustrates a graph of high-rate packet data session usage in the prior art.

FIG. 2 representatively illustrates a graph 200 of high-rate packet data session usage in the prior art. Graph 200 illustrates the number of HRPD sessions 201 over time as well as the number of PPP sessions 202 and the number of active connections 203 to the PSD channel over time. A PPP session 202 is established between the mobile station 102 and PDSN 108 over the A10/A11 interface. Establishing a PPP session 202 allows the mobile station 102 to use the PSD channel 124 to transfer packet data to and from the IP network 113.

As shown in FIG. 2 and noted above, in the prior art each mobile station 102 in communication network 100 requires an HRPD session 201. However, the number of mobile stations 102 that have a PPP session 202 is less than the total number of mobile stations using the communication network 100. Further, of the mobile stations with a PPP session 202, the number of mobile stations actively using the PSD channel (graph 203) is less than the number of PPP sessions 202. The number of mobile stations having a PPP session 202 and actively using PSD channel is less than the number of HRPD sessions because, for example, not all mobile stations may have a subscription to use the PSD channel 124, or not all of the mobile stations are actively using the PSD channel 124 simultaneously. For example, mobile stations may be using CS channel 122 only. The inefficiency of the prior art is shown by the HRPD session capacity difference 204, which represents the HRPD session capacity wasted in communication network 100. Since each HRPD session requires a HRPD resource 106, HRPD resources are also wasted. In an embodiment, the finite number of HRPD resources may be exhausted before other resources in communication network 100.

Figure 3:
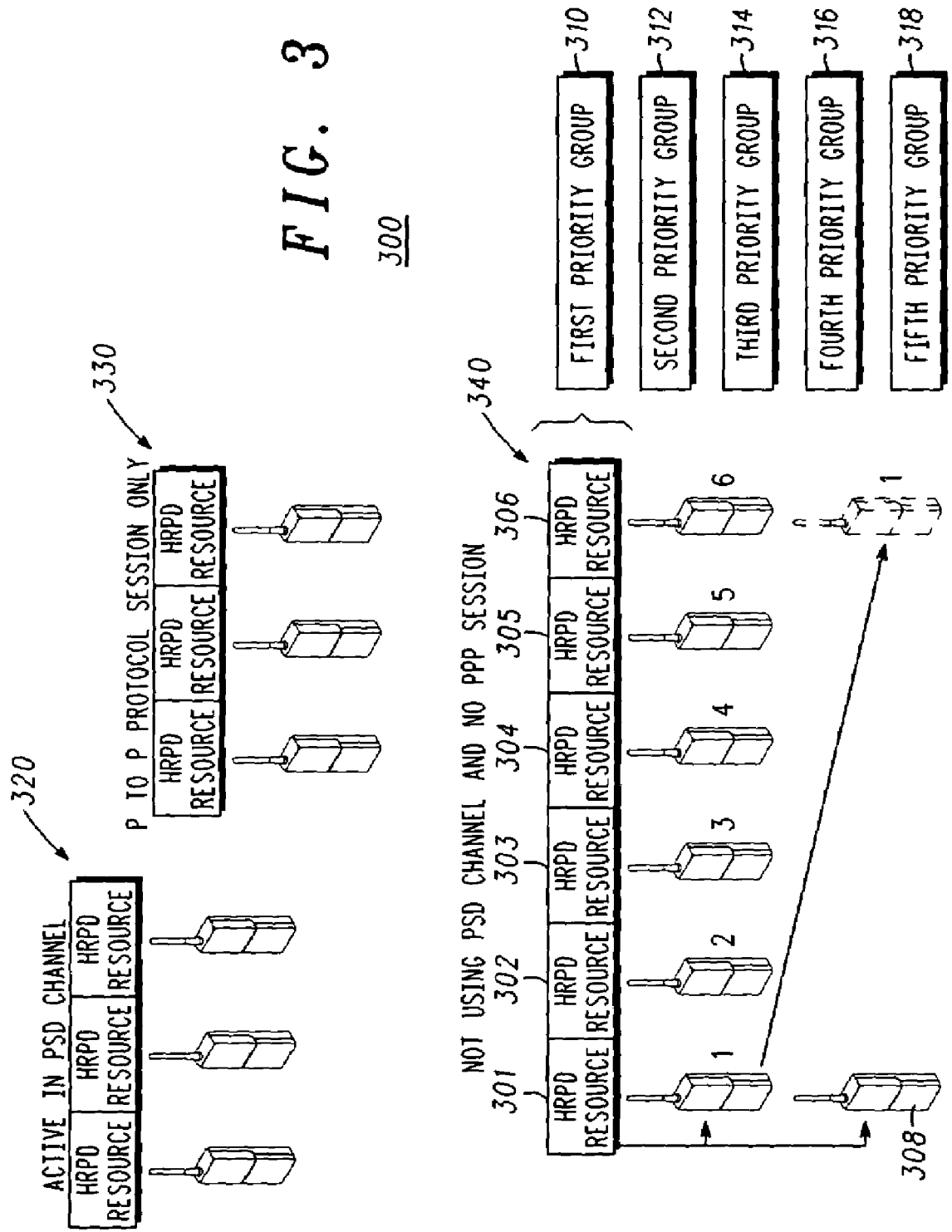
FIG. 3 representatively illustrates a communication network in accordance with an exemplary embodiment of the present invention.

FIG. 3 representatively illustrates a communication network 300 in accordance with an exemplary embodiment of the present invention. In the communication network 300 shown, a plurality of mobile stations 320 actively using a PSD channel is shown along with a plurality of mobile stations 330 with a PPP session that are not currently using a PSD channel. Each of mobile stations in 320 and 330 has an HRPD session and hence use an HRPD resource, such as a terminal identifier and/or a memory space.

Also shown in FIG. 3 are a plurality of mobile stations 340 that are not using a PSD channel and do not have a PPP session, represented by mobile stations 1-6 and their corresponding HRPD resources 301-306. This plurality of mobile stations 340 may have once had a PPP session or have never had one at all. Each of plurality of mobile stations 340 also is in an HRPD session and hence uses an HRPD resource.

Since plurality of mobile stations 340 are not using a PSD channel 124, they are creating inefficiency by having their HRPD session and corresponding HRPD resources. Plurality of mobile stations 340 may use CS channel 122 without having an HRPD session or using an HRPD resource. However, despite plurality of mobile stations 340 not actually needing an HRPD session, plurality of mobile stations 340 must maintain their respective HRPD sessions. Per the EV-DO specification, a mobile station must have an HRPD session to be coupled to the communication network 300, even if the HRPD session is not used to communicate data on the PSD channel 124.

In an embodiment, HRPD resources 301-306 corresponding to plurality of mobile stations 340 may be reassigned to another mobile station 308 in communication network 300 without notifying the mobile station initially using the HRPD resource. In an example of an embodiment, mobile station 1 is assigned HRPD resource 301 and establishes an HRPD session. Another mobile station 308 wirelessly couples to RAN 104. HRPD resource 301 is reassigned to mobile station 308 without notifying mobile station 1. HRPD resource 301 is used to establish an HRPD session for mobile station 308. HRPD session for mobile station 1 is simultaneously maintained with the HRPD session for mobile station 308 while mobile station 1 is idle and not using PSD channel or a PPP session.

In this state mobile station 308 may operate using PSD channel 124 while mobile station 1 may use CS channel 122 but not a PSD channel 124. In effect, mobile station 1 and mobile station 308 share HRPD resource 301 until mobile station 1 attempts to establish a PPP session or use PSD channel 124. Mobile station 1 is not aware that HRPD resource 301 has been reassigned to mobile station 308.

When or if mobile station 1 decides to go active by establishing a PPP session or using PSD channel 124, another HRPD resource from HRPD resources 302-306 may used. For example, if mobile station 1 decides to go active and use PSD channel 124, RAN 104 may determine that mobile station 1 is no longer the valid user of HRPD resource 301. RAN 104 may then find another one of HRPD resources 302-306 that is being used by a mobile station that is not using a PSD channel nor has a PPP session.

For example, HRPD resource 306 currently assigned to mobile station 6 may be reassigned to mobile station 1 without notifying mobile station 6, as shown by the arrow in FIG. 3. Now HRPD resource 306 is used simultaneously by mobile station 6 and mobile station 1 until mobile station 6 decides to use PSD channel 124 or establish a PPP session.

In an embodiment, HRPD resources 301-306 may be prioritized for reassignment. For example, a first priority group 310 may comprise one or more of HRPD resources for corresponding mobile stations that are not subscribed to use a PSD channel 124. For example, first priority group may include HRPD resources assigned to mobile stations that do not have a subscription to use EV-DO resources, but instead use only CS channel 122 or voice-optimized services within communication network 300. In an embodiment, any HRPD resources in first priority group 310 are prime candidates to reassign to subsequent mobile stations, as the mobile stations assigned to first priority group are unable to use PSD channel 124, hence the HRPD session assigned to those mobiles is not used other than for compliance with the EV-DO specification.

In another example, second priority group 312 may comprise one or more HRPD resources corresponding to mobile stations that may have a subscription to use PSD channel 124, but that have not yet ever established a PPP session. A third priority group 314 may comprise one or more HRPD resources corresponding to mobile stations that have had a PPP session in the past, but do not currently have a PPP session. The HRPD resources in third priory group 314 may be further prioritized into a fourth priority group 316 based on how long it has been since a mobile station has had a PPP session.

In yet another embodiment, a fifth priority group 318 may comprise one or more HRPD resources corresponding to mobile stations that have not actively used a PSD channel. This group may be further sorted based on how long it has been since each mobile station has actively used a PSD channel.

Figure 4:
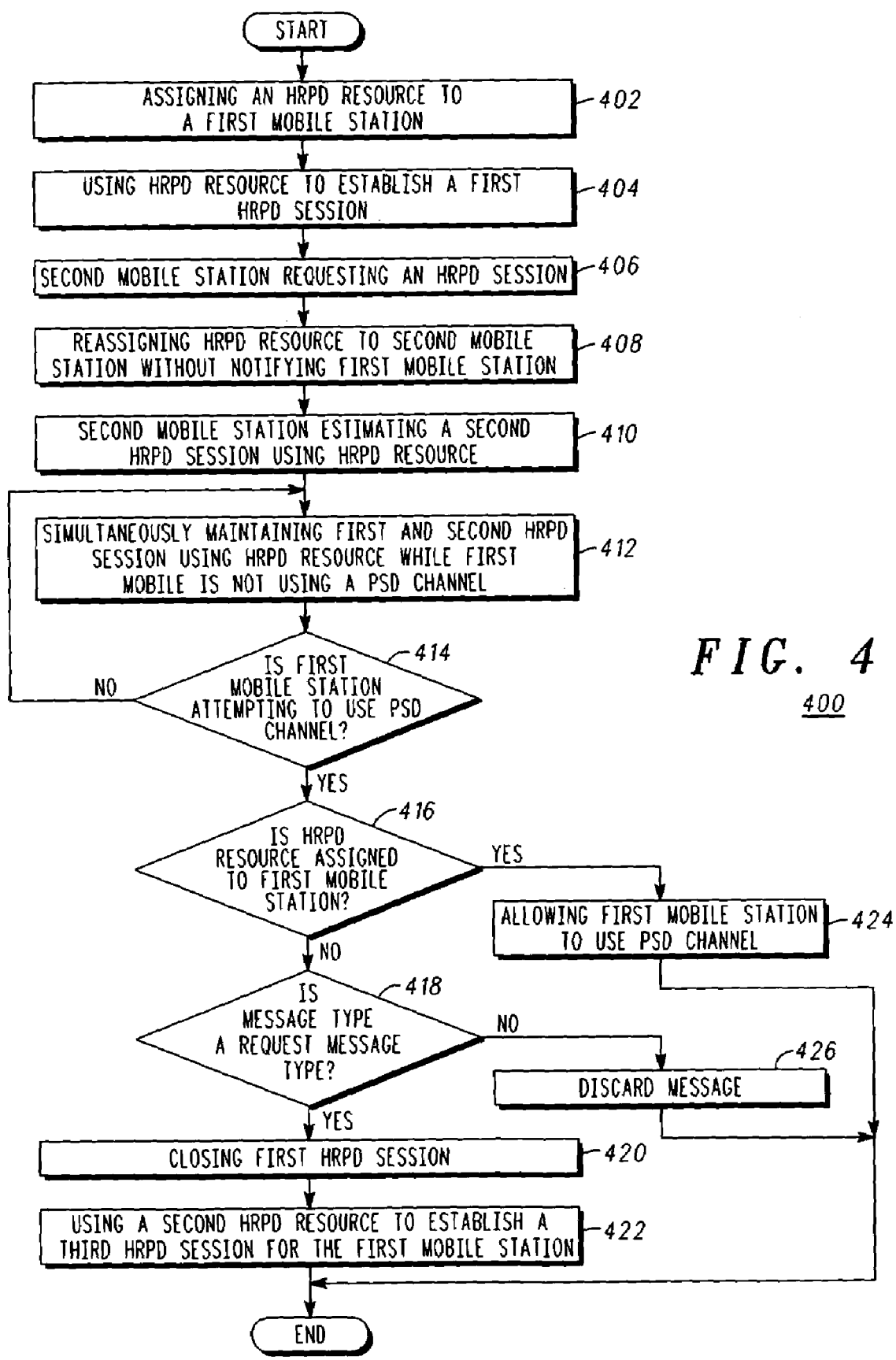
FIG. 4 representatively illustrates a flow diagram in accordance with an exemplary embodiment of the present invention.

FIG. 4 representatively illustrates a flow diagram 400 in accordance with an exemplary embodiment of the present invention. In step 402, an HRPD resource is assigned to a first mobile station that is wirelessly coupled to a RAN. In step 404 the HRPD resource is used to establish a first HRPD session between the first mobile station and the RAN.

In step 406, a second mobile station becomes active with RAN in communication network and requests an HRPD session. In step 408 HRPD resource is reassigned to second mobile station without notifying first mobile station. In step 410 second mobile station establishes second HRPD session using HRPD resource. In step 412, first HRPD session with first mobile station and second HRPD session with second mobile station are maintained simultaneously using the same HRPD resource while first mobile station is not using PSD channel.

In step 414, it is determined if first mobile station is attempting to use a PSD channel. If not, the process returns to step 412. If first mobile station is attempting to use a PSD channel, then it is determined if HRPD resource is assigned to first mobile station in step 416. If so, then first mobile station is allowed to use PSD channel per step 424. If not, then it is determined if the message type sent by first mobile station is a request message type in step 418. Request message type may be, for example and without limitation, a PSD channel request, a connection request, and the like. Other types of messages may be included in request message type and the invention is not limited by the examples described above. If the message type is not a request message type, the message from first mobile station to RAN is discarded per step 426. For example, if first mobile station sent a message to RAN attempting to update its location information because it believed it still had a valid HRPD session and HRPD resource, that message would be discarded. However, if first mobile station sent a PSD channel request message, the system would then realize that this mobile station no longer had a valid HRPD session with HRPD resource and would transmit a session close message, which would then cause the mobile station to transmit a session request message. So in step 418, if the message type transmitted by first mobile station is a request message type, then the first HRPD session with mobile station is closed per step 420 and a second HRPD resource is used to establish a third HRPD session between first mobile station and RAN per step 422. In an embodiment, second HRPD resource may be reassigned from another mobile station (without that mobile station's knowledge) in an analogous manner with the process as described above.

Figure 5:
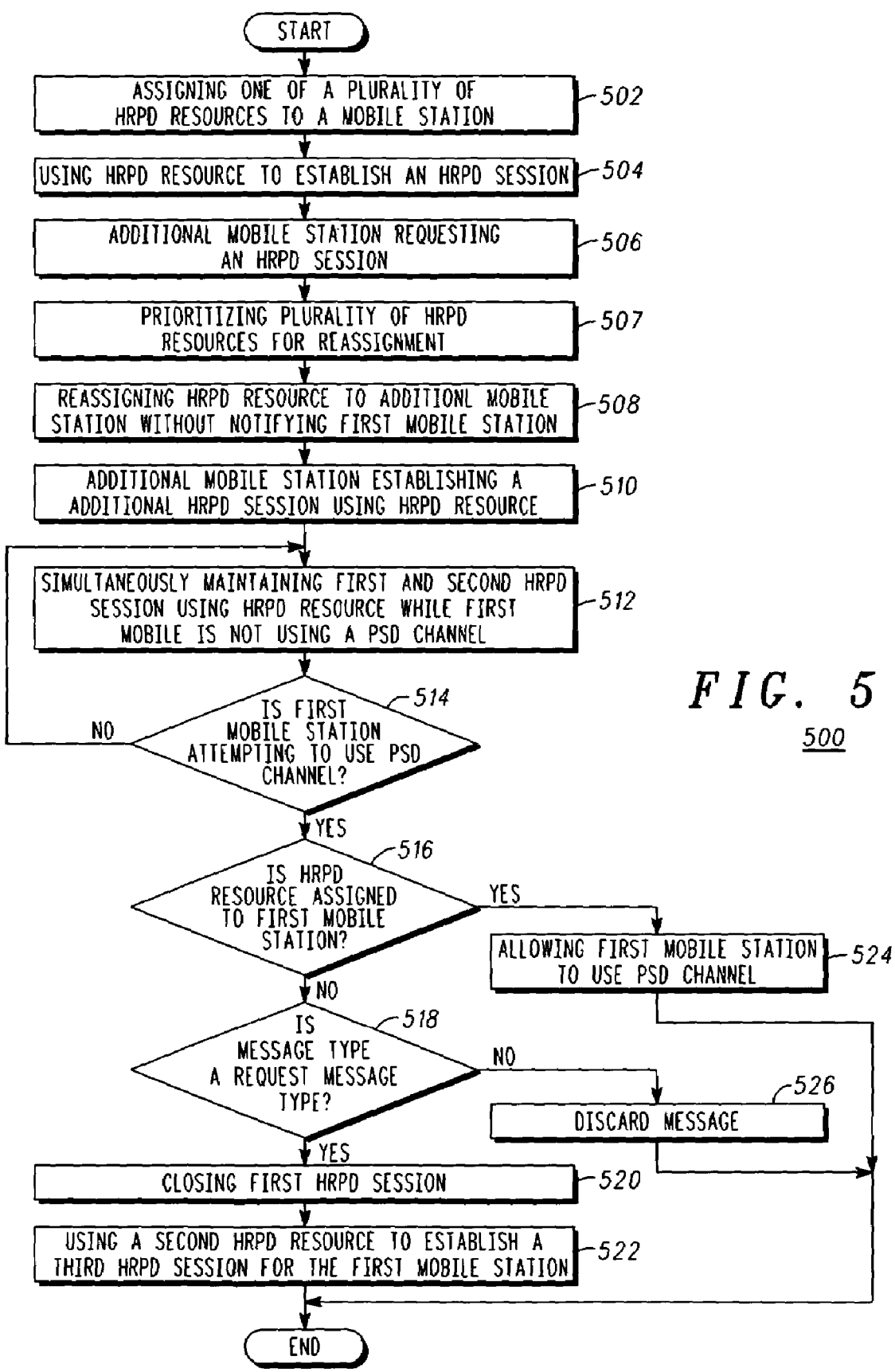
FIG. 5 representatively illustrates a flow diagram in accordance with another exemplary embodiment of the present invention.

FIG. 5 representatively illustrates a flow diagram 500 in accordance with another exemplary embodiment of the present invention. In step 502, one of a plurality of HRPD resources is assigned to a mobile station that is wirelessly coupled to the RAN. In step 504 the HRPD resource is used to establish an HRPD session between the mobile station and the RAN, where the mobile station is not using a PSD channel.

In step 506, another mobile station becomes wireless coupled to the RAN in communication network and requests an HRPD session. In step 507, the plurality of HRPD resources may be prioritized for reassignment using one or more of the priority groups discussed above. In step 508 HRPD resource is reassigned to the additional mobile station without notifying the first mobile station. In step 510 the additional mobile station establishes an additional HRPD session using the HRPD resource. In step 512, the HRPD session with first mobile station and second HRPD session with the second mobile station are maintained simultaneously using the same HRPD resource while first mobile station is not using PSD channel.

In step 514, it is determined if first mobile station is attempting to use a PSD channel. If not, the process returns to step 512. If the first mobile station is attempting to use a PSD channel, then it is determined if the HRPD resource is assigned to the first mobile station in step 516. If so, then the first mobile station is allowed to use a PSD channel per step 524. If not, then it is determined if the message type sent by the first mobile station is a request message type in step 418. Request type message maybe, for example and without limitation, a PSD channel request, a connection request, and the like. Other types of messages may be included in request message type and the invention is not limited by the examples described above. If the message type is not a request message type, the message from the first mobile station to RAN is discarded per step 526. For example, if the first mobile station sent a message to RAN attempting to update its location information because it believed it still had a valid HRPD session and HRPD resource, that message would be discarded. However, if the first mobile station send a PSD channel request message, the system would then realize that this mobile station no longer has a valid HRPD session with HRPD resource and would transmit a session close message, which would then cause the mobile station to transmit a session request message. So in step 518, if the message type transmitted by the first mobile station is a request message type, then the first HRPD session with the first mobile station is closed per step 520 and a second HRPD resource is used to establish a another HRPD session between the first mobile station and RAN per step 522.

The above method and apparatus of the invention increases the effective HRPD session capacity in communication network without increasing available physical capacity in the network, with a minimum effect to an end user. In fact, since the end user is not notified when its HRPD resource has been reassigned, the end user is not aware of the method optimizing HRPD resources within communication network.

In the foregoing specification, the invention has been described with reference to specific exemplary embodiments. However, it will be appreciated that various modifications and changes may be made without departing from the scope of the present invention as set forth in the claims below. The specification and figures are to be regarded in an illustrative manner, rather than a restrictive one and all such modifications are intended to be included within the scope of the present invention. Accordingly, the scope of the invention should be determined by the claims appended hereto and their legal equivalents rather than by merely the examples described above.

For example, the steps recited in any method or process claims may be executed in any order and are not limited to the specific order presented in the claims. Additionally, the components and/or elements recited in any apparatus claims may be assembled or otherwise operationally configured in a variety of permutations to produce substantially the same result as the present invention and are accordingly not limited to the specific configuration recited in the claims.

Benefits, other advantages and solutions to problems have been described above with regard to particular embodiments; however, any benefit, advantage, solution to problem or any element that may cause any particular benefit, advantage or solution to occur or to become more pronounced are not to be construed as critical, required or essential features or components of any or all the claims.

Other combinations and/or modifications of the above-described structures, arrangements, applications, proportions, elements, materials or components used in the practice of the present invention, in addition to those not specifically recited, may be varied or otherwise particularly adapted to specific environments, manufacturing specifications, design parameters or other operating requirements without departing from the general principles of the same.

We claim:

1. A method of optimizing use of a high-rate packet data (HRPD) resource in a communication network having a circuit-switched (CS) channel and a packet-switched data (PSD) channel, comprising:

assigning the HRPD resource to a first mobile station that is coupled to a radio access network of the communication network, wherein the HRPD resource is used to establish a first HRPD session between the first mobile station and the radio access network, and wherein the first mobile station is not using the PSD channel;

a second mobile station wirelessly coupling to;

reassigning the HRPD resource to the second mobile station without notifying the first mobile station, wherein the HRPD resource is used to establish a second HRPD session between the second mobile station and the radio access network; and simultaneously maintaining the first HRPD session and the second HRPD session using the HRPD resource while the first mobile station is not using the PSD channel.

2. The method of claim 1, further comprising:

the first mobile station attempting to use the PSD channel by transmitting a message;

determining if the HRPD resource is assigned to the first mobile station;

if the HRPD resource is not assigned to the first mobile station, determining a message type; and if the message type is a request message type, closing the first HRPD session and using a second HRPD resource to establish a third HRPD session between the first mobile station and the radio access network.

3. The method of claim 1, wherein the HRPD resource is at least one of a terminal identifier and a memory space.

4. The method of claim 3, wherein the terminal identifier is a Unicast Access Terminal Identifier.

5. The method of claim 1, wherein the first mobile station not using the PSD channel comprises the first mobile station not having a point-to-point protocol session.

6. The method of claim 1, wherein the first mobile station not using the PSD channel comprises the first mobile station not subscribed to use the PSD channel.

7. The method of claim 1, wherein the first mobile station not using the PSD channel comprise the first mobile station being in an idle state.

8. The method of claim 1, wherein the first mobile station is active with the CS channel.

9. A method of optimizing use of a plurality of high-rate packet data (HRPD) resources in a communication network having a circuit-switched (CS) channel and a packet-switched data (PSD) channel, comprising:

assigning one of the plurality of HRPD resources to each of a plurality of mobile stations that is coupled to a radio access network, wherein the one of the plurality of HRPD resources is used to establish one of a plurality of HRPD sessions between one of the plurality of mobile stations and a radio access network, and wherein each of the plurality of mobile stations is not using the PSD channel;

an additional mobile station wirelessly coupling to the radio access network and requesting an HRPD session;

selecting a first HRPD resource from the plurality HRPD resources for reassignment, wherein the first HRPD resource corresponds to a first HRPD session of a first mobile station of the plurality of mobile stations;

reassigning the first HRPD resource to the additional mobile station without notifying the first mobile station, wherein the first HRPD resource is used to establish an additional HRPD session between the additional mobile station and the radio access network; and simultaneously maintaining the first HRPD session and the additional HRPD session using the first HRPD resource while the first mobile station is not using the PSD channel.

10. The method of claim 9, further comprising:

the first mobile station attempting to use the PSD channel by transmitting a message;

determining if the first HRPD resource is assigned to the first mobile station;

if the first HRPD resource is not assigned to the first mobile station, determining a message type; and if the message type is a request message type, closing the first HRPD session and using a second HRPD resource to establish another HRPD session between the first mobile station and the radio access network, wherein the second HRPD resource is taken from the plurality of HRPD resources.

11. The method of claim 9, further comprising prioritizing the plurality of HRPD resources for reassignment.

12. The method of claim 11, wherein prioritizing comprises creating a first priority group comprising one or more of plurality of HRPD resources assigned to corresponding one or more plurality of mobile stations that are not subscribed to use the PSD channel.

13. The method of claim 11, wherein prioritizing comprises creating a second priority group comprising one or more of plurality of HRPD resources assigned to corresponding one or more plurality of mobile stations that haven't had a point-to-point protocol session.

14. The method of claim 11, wherein prioritizing comprises creating a third priority group comprising one or more of plurality of HRPD resources assigned to corresponding one or more plurality of mobile stations that have had a point-to-point protocol session but do not currently have the point-to-point protocol session.

15. The method of claim 14, wherein prioritizing comprises creating a fourth priority group sorted based on how long the one or more of plurality of HRPD resources assigned to the corresponding one or more plurality of mobile stations has not had the point-to-point protocol session.

16. The method of claim 11, wherein prioritizing comprises creating a fifth priority group sorted based on how long since one or more of the plurality of mobile stations having one of the plurality of HRPD resources has actively used the PSD channel.

17. In a radio access network, a method of optimizing use of a plurality of high-rate packet data (HRPD) resources, wherein the radio access network is coupled to communicate using a circuit-switched (CS) channel and a packet-switched data (PSD) channel, the method comprising:

assigning one of the plurality of HRPD resources to each of a plurality of mobile stations that is coupled to the radio access network, wherein the one of the plurality of HRPD resources is used to establish one of a plurality of HRPD sessions between one of the plurality of mobile stations and a radio access network, and wherein each of the plurality of mobile stations is not using the PSD channel;

an additional mobile station wirelessly coupling to the radio access network;

selecting a first HRPD resource from the plurality of HRPD resources for reassignment, wherein the first HRPD resource corresponds to a first HRPD session of a first mobile station of the plurality of mobile stations;

reassigning the first HRPD resource to the additional mobile station without notifying the first mobile station, wherein the first HRPD resource is used to establish an additional HRPD session between the additional mobile station and the radio access network; and simultaneously maintaining the first HRPD session and the additional HRPD session using the first HRPD resource while the first mobile station is not using the PSD channel.

18. The method of claim 17, further comprising:

the first mobile station attempting to use the PSD channel by transmitting a message;

determining if the first HRPD resource is assigned to the first mobile station;

if the first HRPD resource is not assigned to the first mobile station, determining a message type; and if the message type is a request message type, closing the first HRPD session and using a second HRPD resource to establish another HRPD session between the first mobile station and the radio access network, wherein the second HRPD resource is taken from the plurality of HRPD resources.

19. The method of claim 17, further comprising prioritizing the plurality of HRPD resources for reassignment.

20. The method of claim 19, wherein prioritizing comprises creating a first priority group comprising one or more of plurality of HRPD resources assigned to corresponding one or more plurality of mobile stations that are not subscribed to use the PSD channel.

21. The method of claim 19, wherein prioritizing comprises creating a second priority group comprising one or more of plurality of HRPD resources assigned to corresponding one or more plurality of mobile stations that haven't had a point-to-point protocol session.

22. The method of claim 19, wherein prioritizing comprises creating a third priority group comprising one or more of plurality of HRPD resources assigned to corresponding one or more plurality of mobile stations that have had a point-to-point protocol session but do not currently have the point-to-point protocol session.

23. The method of claim 22, wherein prioritizing comprises creating a fourth priority group sorted based on how long the one or more of plurality of HRPD resources assigned to the corresponding one or more plurality of mobile stations has not had the point-to-point protocol session.

24. The method of claim 19, wherein prioritizing comprises creating a fifth priority group sorted based on how long since one or more of the plurality of mobile stations having one of the plurality of HRPD resources has actively used the PSD channel.

* * * * *